US011900469B2

(12) United States Patent
Mousty

(10) Patent No.: US 11,900,469 B2
(45) Date of Patent: Feb. 13, 2024

(54) POINT-OF-SERVICE TOOL FOR ENTERING CLAIM INFORMATION

(71) Applicant: STATE FARM MUTUAL AUTOMOBILE INSURANCE COMPANY, Bloomington, IL (US)

(72) Inventor: Jeffrey C. Mousty, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 167 days.

(21) Appl. No.: 17/181,362

(22) Filed: Feb. 22, 2021

(65) Prior Publication Data

US 2021/0174456 A1  Jun. 10, 2021

Related U.S. Application Data

(63) Continuation of application No. 14/747,627, filed on Jun. 23, 2015, now abandoned.
(Continued)

(51) Int. Cl.
*G06F 3/04842* (2022.01)
*G06Q 40/08* (2012.01)
(Continued)

(52) U.S. Cl.
CPC .......... *G06Q 40/08* (2013.01); *G06F 3/0486* (2013.01); *G06F 3/04817* (2013.01); *G06F 3/04842* (2013.01); *G06F 16/22* (2019.01)

(58) Field of Classification Search
CPC .. G06F 3/04817; G06F 3/0481; G06F 3/0486; G06F 16/252
See application file for complete search history.

(56) References Cited

U.S. PATENT DOCUMENTS 4,845,653 A   7/1989   Conrad et al.
6,337,696 B1  1/2002   Lindhorst et al.
(Continued)

FOREIGN PATENT DOCUMENTS

CA    2509734 A1 *  4/2006  ......... G06Q 10/0836
FR    3020883 A1 * 11/2015  ........... G06F 16/152
(Continued)

OTHER PUBLICATIONS

Teachers use of Transnumeration in solving statistical tasks with dynamic statistical software by Lee et al (Year: 2014).*
(Continued)

*Primary Examiner* — Christine M Behncke
*Assistant Examiner* — Mary M Gregg
(74) *Attorney, Agent, or Firm* — MARSHALL, GERSTEIN & BORUN LLP

(57) ABSTRACT

A computer-readable medium stores instructions that, when executed by one or more processors of a computing device, cause the computing device to dynamically generate and display, on an interactive display, one or more person icons and one or more property icons representing persons and properties associated with a loss event. Each person and property icon is generated and displayed as a user adds a corresponding person or property via the interactive display. Each of the person icons is a graphical representation of a person and each of the property icons is a graphical representation of a type of the corresponding property. The instructions also cause the computing device to dynamically link specific ones of the person icons to specific ones of the property icons as the user specifies relationships between the specific ones of the person icons and the specific ones of the property icons via the interactive display.

14 Claims, 6 Drawing Sheets

Related U.S. Application Data

(60) Provisional application No. 62/111,164, filed on Feb. 3, 2015.

(51) Int. Cl.
  G06F 16/22 (2019.01)
  G06F 3/04817 (2022.01)
  G06F 3/0486 (2013.01)

(56) References Cited

U.S. PATENT DOCUMENTS

| | | | |
|---|---|---|---|
| 8,418,147 B1* | 4/2013 | Odenwelder | G06F 11/3684 |
| | | | 717/131 |
| 8,554,587 B1 | 10/2013 | Nowak | |
| 8,738,404 B1 | 5/2014 | Burns et al. | |
| 9,886,794 B2 | 2/2018 | van Os et al. | |
| 10,297,374 B1* | 5/2019 | Oh | H01C 7/112 |
| 2002/0082944 A1 | 6/2002 | Uchimi et al. | |
| 2002/0147613 A1* | 10/2002 | Kennard | G06Q 30/06 |
| | | | 715/700 |
| 2003/0156119 A1 | 8/2003 | Bonadio | |
| 2005/0049958 A1 | 3/2005 | Macolino | |
| 2005/0154617 A1 | 7/2005 | Ruggieri et al. | |
| 2006/0074788 A1* | 4/2006 | Grizack | G06Q 40/02 |
| | | | 705/35 |
| 2006/0100912 A1 | 5/2006 | Kumar et al. | |
| 2006/0143056 A1 | 6/2006 | Taylor et al. | |
| 2007/0061357 A1 | 3/2007 | Jensen | |
| 2007/0067735 A1 | 3/2007 | Hawley et al. | |
| 2007/0150319 A1 | 6/2007 | Menendez | |
| 2007/0226018 A1 | 9/2007 | Gross et al. | |
| 2009/0083396 A1 | 3/2009 | Roos | |
| 2009/0193461 A1* | 7/2009 | Yuki | H04N 5/45 |
| | | | 725/39 |
| 2010/0030526 A1 | 2/2010 | Brooks et al. | |
| 2010/0036683 A1 | 2/2010 | Logan | |
| 2010/0058216 A1* | 3/2010 | Yoon | G06F 3/0486 |
| | | | 715/825 |
| 2010/0310232 A1 | 12/2010 | Iwase et al. | |
| 2010/0324941 A1 | 12/2010 | Stevenson et al. | |
| 2011/0117878 A1 | 5/2011 | Barash et al. | |
| 2011/0289448 A1 | 11/2011 | Tanaka | |
| 2012/0038579 A1 | 2/2012 | Sasaki | |
| 2012/0095969 A1 | 4/2012 | Bailey | |
| 2012/0104250 A1* | 5/2012 | Bean | H01J 37/26 |
| | | | 250/307 |
| 2012/0212443 A1 | 8/2012 | Tomimori | |
| 2012/0232932 A1 | 9/2012 | Voccola | |
| 2012/0265633 A1 | 10/2012 | Wohlstadter et al. | |
| 2013/0232463 A1* | 9/2013 | Nagaraja | G06F 8/70 |
| | | | 717/101 |
| 2014/0100893 A1 | 4/2014 | Zizzi | |
| 2014/0179377 A1 | 6/2014 | Song et al. | |
| 2014/0236643 A1 | 8/2014 | Comfort et al. | |
| 2014/0245210 A1 | 8/2014 | Battcher et al. | |
| 2015/0032480 A1 | 1/2015 | Blackhurst et al. | |
| 2015/0172894 A1 | 6/2015 | Gabel | |
| 2015/0206078 A1 | 7/2015 | Giroti et al. | |
| 2015/0287152 A1 | 10/2015 | Oakes | |
| 2016/0232616 A1 | 8/2016 | Le | |

FOREIGN PATENT DOCUMENTS

| | | | | |
|---|---|---|---|---|
| WO | WO-0051021 A2 * | 8/2000 | | G06F 16/10 |
| WO | WO-2008038004 A2 * | 4/2008 | | G06F 17/30126 |
| WO | WO-2014041813 A1 * | 3/2014 | | G06F 17/30876 |

OTHER PUBLICATIONS

Side by Side in Windows 7—by Forums CNET; p. 6; Nov. 11, 2011 (Year: 2011).

Windows 7: Side by side web pages by Windows SevenForums; 2 pages ; Sep. 2014 (Year: 2014).

Word 2013 Showing Two pages side by side; 2 pages; Mar. 2014 (Year: 2014).

Create Expressive Icons in PowerPoint by Presentation-Process. com <http://Presentation-Process.com>; 2011; 7 pages (Year: 2011).

* cited by examiner

POINT-OF-SERVICE TOOL FOR ENTERING CLAIM INFORMATION

CROSS-REFERENCE TO RELATED APPLICATION

This is a continuation of U.S. Provisional patent application Ser. No. 14/747,627, entitled "Point-of-Service Tool for Entering Claim Information" and filed on Jun. 23, 2015, which claims the benefit of U.S. Provisional Patent Application No. 62/111,164, entitled "Point-of-Service Tool for Entering Claim Information" and filed on Feb. 3, 2015. The disclosure of each of the patent applications identified above is hereby incorporated herein by reference in its entirety.

FIELD OF THE DISCLOSURE

The present disclosure generally relates to insurance and, more specifically, to entering information relating to insurance claims.

BACKGROUND

When handling calls from customers who have been involved in an accident, insurance claim associates may typically use loss reporting software tools that facilitate the entry of information needed to set up a new claim. Conventional loss reporting tools may be generally arranged as a set of questions or prompts, each requiring that the claim associate ask the customer for the information that is needed to respond (e.g., the type of accident, the people and vehicles involved, the location of the accident, etc.). However, because these tools provide the questions/prompts in a highly scripted, linear/sequential manner, the claim associate often must rigidly direct the flow of the conversation. Both the claim associate and the customer may find this process to be inefficient and/or frustrating.

Alternatively, if the customer is allowed to relate the details of the event/accident in a more natural, flowing manner, the claim associate may likely need to ask the customer to repeat information that the customer already provided, and/or the associate might need to rely heavily on a separate software application allowing the entry of free-form, typed notes. Both of these scenarios can give rise to additional problems.

For example, the customer may become frustrated if he or she must provide the same information multiple times. Moreover, if the claim associate heavily relies on a note-taking application, the associate may be distracted by the need to faithfully record the majority of the customer's narrative. Still further, the claim associate may need to review those notes as needed to enter information at a later stage of the scripted loss reporting process, which may cause the customer to experience "dead air" time, increase the probability of date entry errors, and/or increase the total time that it takes the associate to handle the claim.

BRIEF SUMMARY

The present embodiments may, inter alia, provide claim associates or other users (e.g., customers) with a loss reporting tool that allows claim information to be entered in an intuitive, non-scripted manner, thereby improving the associate and/or customer experience, reducing claim handling times, and/or reducing the likelihood of data entry errors.

In one aspect, a non-transitory computer-readable medium stores instructions that, when executed by one or more processors of a computing device, cause the computing device to: (1) dynamically generate and display, on an interactive display, one or more person icons and one or more property icons representing persons and properties associated with a loss event, wherein each of the person icons and each of the property icons is generated and displayed as a user adds a corresponding person or property via the interactive display, and wherein each of the person icons is a graphical representation of a person and each of the property icons is a graphical representation of a type of the corresponding property; and (2) dynamically link specific ones of the person icons to specific ones of the property icons as the user specifies relationships between the specific ones of the person icons and the specific ones of the property icons via the interactive display.

In another aspect, a method facilitates efficient entry, by a user, of loss event information via an interactive display provided by a loss reporting tool. The method includes: (1) dynamically generating and displaying, on the interactive display, one or more person icons and one or more property icons representing persons and properties associated with a loss event, wherein each of the person icons and each of the property icons is generated and displayed as a user adds a corresponding person or property via the interactive display, and wherein each of the person icons is a graphical representation of a person and each of the property icons is a graphical representation of a type of the corresponding property; and (2) dynamically linking specific ones of the person icons to specific ones of the property icons as the user specifies relationships between the specific ones of the person icons and the specific ones of the property icons via the interactive display.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

DETAILED DESCRIPTION

Figure 1:
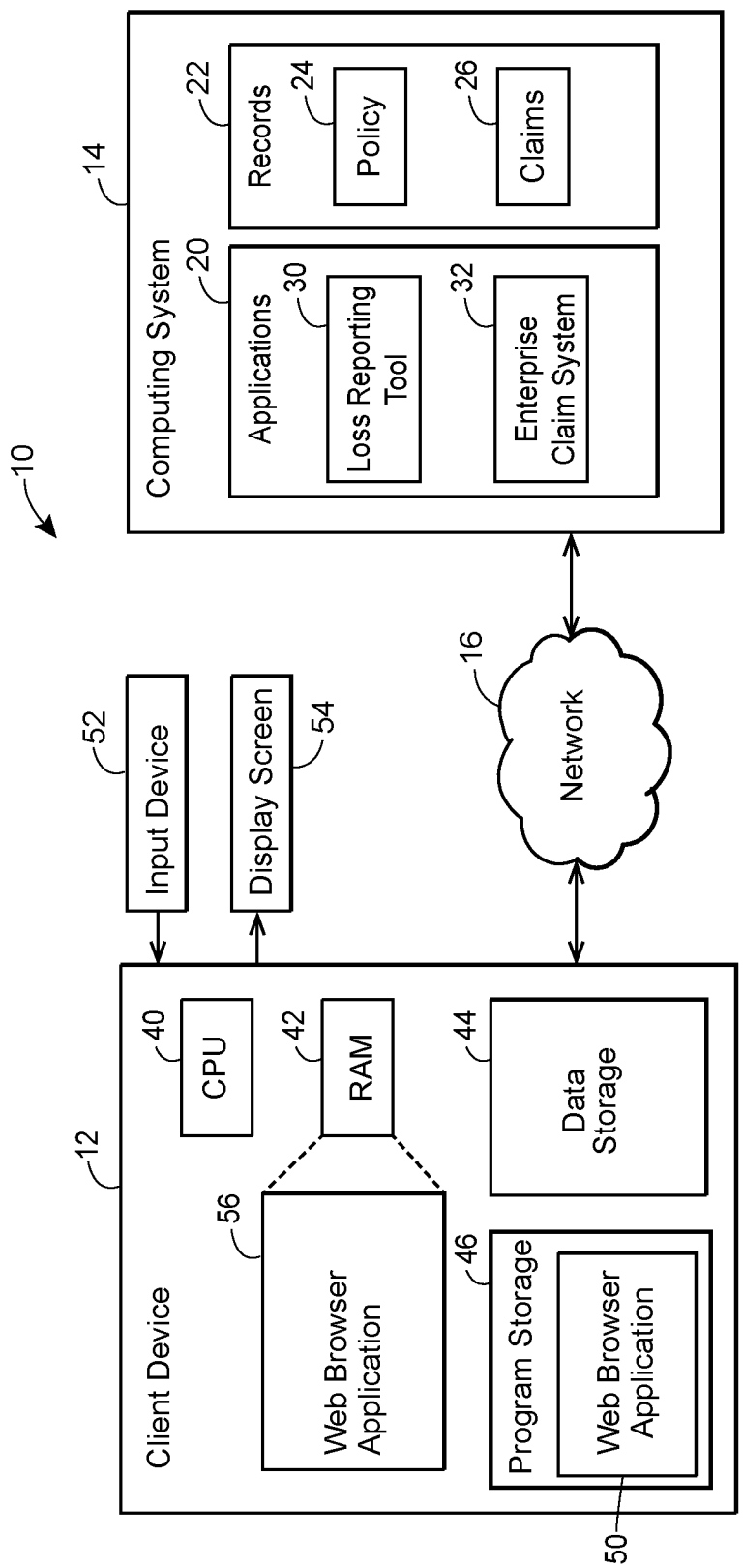
FIG. 1 depicts an exemplary environment including components associated with the provision, operation and/or use of a loss reporting tool that may improve the efficiency of claim information entry for claim associates and/or other users, according to one embodiment.

I. Exemplary Tool for Efficient Loss Reporting

The present embodiments relate to, inter alia, the provision, operation and/or use of a loss reporting tool that enables claim associates and/or other users (e.g., customers) to more efficiently perform loss intake reporting, without necessarily following a "script" or predetermined sequence of gathering or entering information, and without necessarily relying on ancillary note-taking to any great degree. The loss reporting tool may be used for any type or types of insurance, such as automobile or other vehicle insurance, fire/home insurance, personal property or personal articles insurance, life insurance, health insurance, and/or pet insurance, for example.

In some embodiments, an initial screen may allow the claim associate to enter basic information about a customer who is calling to report a loss, such as the customer's name, phone number (and/or other contact information), and/or insurance policy number, for example. The claim associate may then select the applicable type of insurance (e.g., auto or fire/home, if the insurance provider offers both insurance types). Alternatively, the type of insurance may be determined automatically based upon the policy number, or the insurance provider may only offer a single type of insurance. After the claim associate enters the basic caller information and/or selects the appropriate insurance type, the claim associate may be presented with a display screen provided by the loss reporting tool (e.g., in response to the user selecting a link or short-cut to the loss reporting tool).

The loss reporting display screen may include a caller summary area showing certain key attributes of the customer/caller that were previously entered by the associate, and/or attributes that the system retrieved based upon the entered name and/or policy number. For example, the caller summary area may show the name, policy number, phone number and coverage information (e.g., types of auto coverage, etc.) of the caller. Some or all of the caller information may provide the claim associate a link to more detailed information. For example, the claim associate may be able to click on the caller name to see more details about the caller on the same display (e.g., in the "detail area" described further below) or to transfer to a new display and/or program that provides more information about the caller (e.g., street address, claim history, etc.). As another example, the claim associate may be able to click on the policy number and/or coverage information to transfer to a new display and/or program that provides more information about the caller's policy.

Some or all of the caller information in the caller summary area may be color-coded, according to a predetermined color-coding key, to indicate that the information pertains to an individual insured by the insurance provider (also referred to herein simply as "an insured"). As just one example, the caller information may be colored red to indicate that the information pertains to an insured. Of course, any suitable color coding key/scheme may be used.

The loss reporting display screen may also include areas that summarize certain aspects of the information that has been added to the loss report. For example, a person summary area may show one icon (e.g., a small stick figure or other human-like icon) for each person that was involved in the accident/loss, and a property summary area may show one icon (e.g., a small car-like icon for each involved vehicle, a small house-like icon for each involved house or other residence, etc.) for each property that was involved in the accident/loss. Each icon in the person summary area may be color-coded according to the predetermined color-coding key. For example, each insured (e.g., the caller and/or one or more other people involved in the loss event and on the same insurance policy) may be color-coded the same hue/tint/shade of red as the caller information in the caller summary area, each claimant (e.g., individuals other than an insured who were involved in the loss event, and suffered a loss for which the insurance provider may need to provide compensation) may be color-coded blue, and each "other" individual (e.g., witnesses to the loss event) may be color-coded green.

Each icon in the property summary area may be color-coded to match the color of the person, or the person type, with which the property is associated. For example, a car icon may be color-coded the same hue/tint/share of red as the caller information (and/or as a person icon representing the caller) if the caller/insured is known to be the owner of the car that corresponds to the car icon. As another example, a house icon may be color-coded the same hue/tint/shade of blue as a particular claimant's icon if that claimant is known to be the owner or renter of a house that corresponds to the house icon. As still another example, a house icon may be color-coded blue if the corresponding house is generally known to be owned or rented by a claimant, even if information identifying that claimant has not yet been provided or otherwise ascertained.

The claim associate may select any of the icons in the person summary area, and/or any of the icons in the property summary area, to view more detailed information about the corresponding person or property in a detail area of the loss reporting display screen. If the claim associate selects a person icon in the person summary area, for example, the detail area may show the name of the person corresponding to the selected icon, a list of that person's properties that were involved in the loss event, and/or other information about that person. The listed properties may correspond to respective properties that are represented by icons in the property summary area. If the claim associate selects a particular property (e.g., by clicking on the corresponding icon within the property summary area, or by clicking on the corresponding property within a property list provided for a particular person in the detail area), the detail area may show additional information about that property, such as a make, model and year for a car, and/or policy numbers of insurance policies listing the property, for example.

In one embodiment, a claim associate's computing device may present a graphical user interface with a number of insurance-related icons during a telephone call with an insurance customer. During the conversation with the insurance customer, the claim associate may quickly and accurately enter and store insurance-related information that the customer is saying and in real-time, such as by swiping, touching, pressing, and/or clicking upon various icons. The icons may graphically or visually represent a number of insurance-related items, such as those shown in FIG. 2. For instance, icons may visually represent customers, family members (spouses, children, parents, etc.), pets, others involved in car accidents (other drivers, pedestrians, passengers, those injured, etc.), location and/or severity of accidents, properties or homes, vehicles, relationships, types of insurance policies or claims, loss reporting (mentioned further below), etc. By selecting an icon, a claim associate may be able to quickly enter information associated with the object that the icon represents (such as by selecting another icon, selecting an item or option from a menu (e.g., type of loss or claim—auto, home, life, pet, etc.), by entering or typing text, or by other means). As a result, insurance-related information given during the call with the customer may be entered accurately and stored for future use and reference in a time efficient manner, which may enhance the customer experience by lessening requirements on customer time, and/or not requiring the customer to repeat information or answer repetitive questions. Additionally or alternatively, the customer may be presented with a similar graphical user interface for self-entry of insurance-related information and remote submission thereof to an insurance provider remote server.

The loss reporting display screen may also include inputs or for entering person and property information that is to be added to the loss report. For example, one input (e.g., a virtual button, drop-down menu, etc.) may allow the claim associate to add, or begin adding, a new person to the loss report. If that input is activated, an additional input may allow the claim associate to select whether the new person is an insured, a claimant, or "other" (e.g., a person having a different role in the loss event), and to enter information such as the person's name, the person's properties that were involved in the loss event, the person's home address, whether the person was injured in the loss event, and/or which property or properties are associated with (e.g., owned by) that person, for example. Once the new person has been added, an icon representing that person may be added to the person summary area (e.g., as described above).

As another example, one input may allow the claim associate to add, or begin adding, a new property to the loss report. If that input is activated, an additional input may allow the claim associate to select whether the new property belongs to an insured or a claimant, and to enter information such as a description of the property (e.g., make, model and year of a car), whether the property was damaged in the loss event, and/or the name of the person to which the property belongs, for example. Once the new property has been added, an icon representing that property may be added to the property summary area (e.g., as described above).

When adding a new person or a new property, in some embodiments, the claim associate may be able to take a "short cut" when indicating a new person's property, or when indicating a new property's owner/renter/etc., respectively. If the person summary area already includes an icon corresponding to a person who owns a car that is currently being added by the claim associate, for example, the associate may be able to simply click on that person's icon (or "drag and drop" that icon to a particular area of the display screen, etc.) in order to indicate that the person is the owner of the newly added car. As another example, if the property summary area already includes an icon corresponding to a house owned by a person that is currently being added by the claim associate, the associate may be able to simply click on that house's icon (or drag and drop that icon to a particular area of the display screen, etc.) in order to indicate that the house is owned by the newly added person.

The loss reporting display screen may also include other information and/or inputs. For example, the display screen may include an area in which the claim associate may enter free-form notes (which may then be saved in a loss record along with the rest of the loss report), areas for text and/or images that provide guidance (e.g., standard claim processes (SCPs)) to the claim associate or other user, one or more tabs that allow the claim associate to perform various other actions and/or record other types of information, etc.

In some embodiments, various templates may be available to the claim associate, and may facilitate entry of a loss report by automatically entering certain pieces of relevant information. For example, a "rear-end collision" template may, if selected by the claim associate, automatically add two people and two vehicles to the loss report, with one person and one vehicle being tagged as "insured" and one person and one vehicle being tagged as "claimant." Thus, for example, the person summary area may initially show one red person icon and one red vehicle icon (for the insured), and one blue person icon and one blue vehicle icon (for the claimant). The claim associate may then have the option of adding insured, claimant and/or "other" individuals, and/or adding properties, as needed for the specific claim (e.g., based upon information received during the customer call). Alternatively, the "rear-end collision" template may add multiple insureds, multiple claimants, etc., and the claim associate may have the option of adding or removing any of those individuals.

While the loss reporting tool has been described thus far primarily with respect to use by a claim associate, others may use the tool in other embodiments and/or scenarios. For example, a customer may, instead of (or in addition to) calling a claim associate to report a loss, directly use the loss reporting tool. While customers have been unable to use conventional loss reporting tools for a myriad of technical and other reasons, the highly intuitive user interface of the loss reporting tool described herein makes such an approach feasible.

By using one or more of the techniques described above, claim associates or other individuals (e.g., customers) may more efficiently and quickly enter loss report information, and/or enter the information with less repetition and/or fewer errors. As a result, both claim associates and customers may experience fewer delays and less frustration, and the integrity of the loss reporting process may be strengthened.

II. Exemplary Environment for Provision, Operation and/or Use of a Tool that Improves Efficiency of Loss Reporting FIG. 1 depicts an exemplary environment 10 including components associated with the provision, operation and use of a tool that may improve the efficiency of loss reporting for claim associates, customers and/or other users, according to an embodiment. As illustrated in FIG. 1, the environment 10 may include a client device 12 and a computing system 14. The computing system 14 may include one or more servers of an insurance provider, such as a home/fire and/or automobile insurance company, for example. The user of the client device 12 may be an employee of the insurance provider (e.g., a claim associate/representative) or a customer/policyholder, for example. For ease of explanation, however, the description of FIG. 1 that follows will refer primarily to an embodiment and/or scenario in which the user is a claim associate. The computing system 14 may be communicatively coupled to the client device 12 via a network 16. The network 16 may be a single communication network, or may include multiple communication networks of one or more types (e.g., one or more wired and/or wireless local area networks (LANs), and/or one or more wired and/or wireless wide area networks (WANs) such as the Internet).

The computing system 14 may include one or more non-volatile memories storing the instructions of a number of applications 20, and storing a number of records 22. The applications 20 may include a loss reporting tool 30 and an enterprise claim system 32. In some embodiments, the applications 20 may include more applications than those shown in FIG. 1, and/or the enterprise claim system 32 may be omitted (e.g., if residing in a different computing system not shown in FIG. 1).

Generally, the loss reporting tool 30 may enable claim associates to enter information about loss events (e.g., while speaking with customers who call to report accidents or other loss events), and the information entered via the loss reporting tool 30 may be transferred to the enterprise claim system 32 for claim processing. The loss reporting tool 30 may include instructions of one or more web pages (e.g., HyperText Markup Language (HTML) instructions, JavaScript instructions, JavaServer Pages (JSP) instructions, and/or any other type of instructions suitable for defining the content and presentation of the web page(s)), and/or may include instructions of a plug-in, extension and/or stand-alone software component that may be downloaded by the client device 12 from the computing system 14, for example.

The records 22 may include a policy database 24 and a claims database 26. As used herein, a "database" may refer to a single database or a collection of multiple databases stored in one or more memories. The policy database 24 may contain information about particular customer insurance policies, such as policy numbers, information about the policyholders (e.g., names, addresses, contact information, etc.), and coverage information for the policies (e.g., coverage types, limits, deductibles, etc.), for example. The claims database 26 may include information regarding open and/or closed customer claims, such as loss event descriptions that were previously entered using the loss reporting tool 30, history and/or disposition/status of each of the claims, etc. In some embodiments, the records 22 may include additional databases beyond those shown in FIG. 1, and/or one or both of databases 24, 26 may be stored elsewhere (e.g., in a memory of a computing system not shown in FIG. 1).

While multiple claim associates and client devices may, in some embodiments, access the loss reporting tool 30 (and possibly the enterprise claim system 32), for clarity FIG. 1 illustrates only the example client device 12 of a single claim associate. As illustrated in FIG. 1, client device 12 may include a central processing unit (CPU) 40 to execute computer-readable instructions, a random access memory (RAM) 42 to store the instructions and data during operation of programs, a data storage 44 that may include persistent/non-volatile memory to store data used by the programs executed by CPU 40, and a program storage 46 that may include persistent/non-volatile memory to store the programs/instructions executed by CPU 40, including, for example, a web browser application 50. By way of example, the data storage 44 and/or the program storage 46 may be implemented on a hard disk drive coupled to CPU 40 via a bus (not shown in FIG. 1). More generally, the components 40, 42, 44 and 46 may be implemented in any suitable manner according to known techniques.

Client or mobile device 12 may be a personal computer (e.g., a desktop or other computer, etc.), or any other suitable stationary or portable computing device or mobile device, such as a smartphone, tablet, laptop, notebook, netbook, phablet, personal digital assistant (PDA), pager, smart glasses, smart watch or bracelet, or wearable electronics, for example. While client device 12 in the example of FIG. 1 may include both storage and processing components, client device 12 may instead be a so-called "thin" client that depends upon another computing device for certain computing and/or storage functions. For example, data storage 44 and/or program storage 46 may be external to client device 12 (e.g., in the computing system 14) and connected to client device 12 via a network link (e.g., network 16).

Further, client device 12 may be coupled to an input device 52 that allows the claim associate to enter inputs to client device 12, and a display screen 54 that allows the claim associate to view outputs/displays generated by client device 12. The input device 52 may be a pointing device such as a mouse, keyboard, trackball device, digitizing tablet or microphone, for example. The display screen 54 may be a single monitor screen or a set of two or more monitor screens, for example. In one embodiment, input device 52 and display screen 54 may be integrated as parts of a single device (e.g., a touch screen device). Using the input device 52 and the display screen 54, a claim associate may be able to interact with graphical user interfaces (GUIs) provided by the client device 12.

When CPU 40 executes the web browser application 50, RAM 42 may temporarily store the instructions and data required for its execution. In FIG. 1, the web browser application 50 being executed is represented in the program space of RAM 42 as web browser application 56. When the claim associate uses the web browser application 56 to access the loss reporting tool 30 (e.g., in an embodiment where the loss reporting tool 30 is provided as one or more web pages), for example, the instructions of the corresponding web page(s) may be stored as a local copy (not shown in FIG. 1) in RAM 42, and the web browser application 56 may interpret the instructions of the local copy at runtime. When interpreting the instructions, the web browser application 56 may present the user interface(s) of the loss reporting tool 30 to the claim associate, and may enable the associate to interact with the presented user interface(s).

While FIG. 1 depicts an embodiment in which the loss reporting tool 30 is implemented as a web page accessed via a web browser, in other embodiments the loss reporting tool 30 may, at least in part, be implemented as a dedicated software application stored locally in program storage 46 and executed by CPU 40. In such an embodiment, the loss reporting tool 30 may communicate with the computing system 14 via network 16 as needed (e.g., in order to access information in policy database 24 and/or claims database 26 if the claim associate selects a link to additional policy and/or claim information, or to submit information for storage in claims database 26 when a loss report is submitted, etc.).

Operation of the components in the environment 10 will now be described with reference to the example interactive displays provided in FIGS. 2 and 3, according to one embodiment and scenario. Some or all of the interactive displays of FIGS. 2 and 3 may represent the appearance of the display screen 54 when a claim associate has used the web browser application 50 to access the loss reporting tool 30, for example. In some embodiments, the precise layout (e.g., sizes and/or position) and/or content of various portions of the interactive displays may be different than shown in FIGS. 2 and 3. Moreover, the layout may be configurable by the claim associate (e.g., according to saved presets for the associate, and/or as the associate is working with the loss reporting tool 30) and/or by other individuals (e.g., by information technology staff).

It is understood that the information, links and/or functionality provided by the interactive displays of FIGS. 2 and 3, and/or described below, may be different in other embodiments and/or scenarios. Further, as was noted above, the user of client device 12 may be a customer/policyholder rather than a claim associate (e.g., in embodiments where customers directly use the loss reporting tool 30 to enter information relating to an accident or other loss event). While FIGS. 2 and 3 are discussed primarily with reference to use by a claim associate, the appearance and/or functionality of the interactive displays of FIGS. 2 and 3 may depend upon whether the displays are being accessed by a claim associate or a customer (e.g., as discussed further below).

III. Exemplary Loss Reporting Tool Interactive Display

Figure 2:
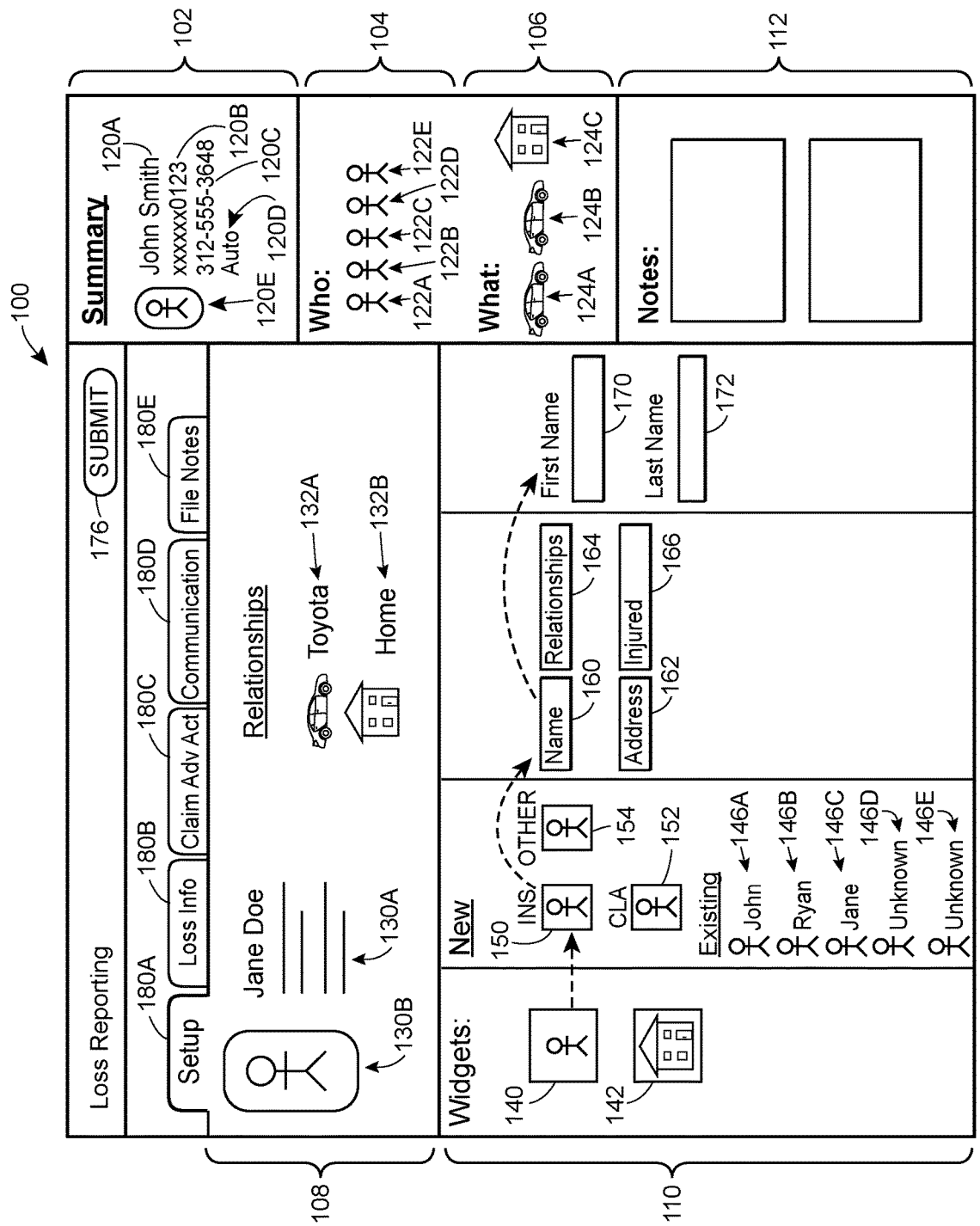
FIG. 2 depicts an exemplary loss reporting tool interactive display that may be used by a claim associate or other user to enter insurance claim information, according to one embodiment.

FIG. 2 depicts an exemplary interactive display 100, provided by a loss reporting tool such as loss reporting tool 30 of FIG. 1, that may be used by a claim associate or other user to enter insurance claim information (e.g., information about an accident or other loss event), according to an embodiment. The interactive display 100 may include a caller summary area 102, a person summary area 104, a property summary area 106, a detail area 108, a "widget" area 110 with a plurality of user-interactive controls/inputs, and a notes area 112. In other embodiments, the interactive display 100 may include more, fewer and/or different areas than those shown in FIG. 2. The interactive display 100 may be fitted entirely within a display screen (e.g., display screen 54 of FIG. 1), or may require vertical and/or horizontal scrolling to view all parts of the interactive display 100, for example.

The caller summary area 102 may show basic information about a customer who is calling the claim associate. As discussed further below in connection with FIG. 3, the claim associate may have entered some or all of the information in the caller summary area 102 at an earlier time during the call. In some embodiments, some of the information in the caller summary area 102 may have been automatically retrieved by the loss reporting tool 30 based upon other identifying information that the claim associate had entered (e.g., caller name, policy number, etc.).

As seen in the exemplary embodiment and scenario of FIG. 2, the caller summary area 102 may show the caller's name 120A, the caller's policy number 120B (not necessarily redacted as shown in FIG. 2), the caller's telephone number 120C (and/or other contact information, such as an email, home address, etc.), and a coverage indicator 120D providing information about coverages included in the caller's insurance policy. While the coverage indicator 120D in the example of FIG. 2 only shows that the caller has an "auto" policy, in other embodiments and/or scenarios the coverage indicator 120D may show more detailed coverage information, such as auto coverage types (e.g., comprehensive, bodily injury, etc.), coverage limits, and/or coverage deductibles, for example.

The caller summary area 102 may also depict a person icon 120E. The icon 120E, and/or some or all of the other caller information elements 120A-120D in the caller summary area 102, may be color-coded according to a predetermined color-coding key to indicate that, with respect to the loss event being reported, the information is associated with an "insured" rather than a "claimant" or other category of person. As just one example, the elements 120A-120E may all be color-coded red to indicate that the information pertains to an insured.

One, some or all of the elements 120A-120E may be selectable by the claim associate in order to view more detailed information. For example, clicking on (or touching on a touch screen, etc.) the icon 120E or the name 120A may cause the detail area 108 to show more information about the caller (e.g., information of the sort discussed below in connection with detail area 108). Additionally, or alternatively, selecting some of elements 120A-120E may cause a new window or screen to appear with the corresponding information. For example, clicking on (or touching, etc.) the policy number 120B or coverage indicator 120D may cause a pop-up window to appear that lists details about the caller's insurance policy, past and/or pending claims, etc.

The person summary area 104 may show one icon 122 for each person that has thus far been added to the loss report for the loss event. As seen in FIG. 2, five people (corresponding to icons 122A-122E) have been added to the loss report in this example scenario. Each person/icon 122 may have been added using any one of the mechanisms that will be described further below, such as using inputs in the widget area 110, and/or using a template that automatically adds people and/or properties to the loss report, for example.

Each icon 122 may be any suitable type of icon, such as a small stick figure or other human-like icon, for example, and may be color-coded according to the predetermined color-coding key. In one scenario, for example, icons 122A and 122B may be color-coded red to indicate that they represent insured individuals (e.g., the caller identified in the caller summary area 102, plus another person that was involved in the loss event and listed on the same insurance policy as the caller, respectively). The red color may be the same color as the elements 120A-120E in the caller summary area 102, for example.

Continuing with this example scenario, icons 122C and 122D may be color-coded blue to indicate that they represent claimants (e.g., passengers in another vehicle that was struck by the caller's vehicle, etc.), and icon 122E may be color-coded green to indicate that it represents a person in a different, "other" category. The "other" category may generally be reserved for any non-insured, non-claimant person that should be recorded in connection with the loss event, or may be reserved for one or more specific categories (e.g., witnesses to the loss event).

The property summary area 106 may show one icon 124 for each property that has thus far been added to the loss report for the loss event. As seen in the example scenario of FIG. 2, three properties (corresponding to icons 124A-124C) have been added to the loss report: two vehicles, and one house (e.g., for a loss event in which two vehicles collided, and one or both vehicles then careened into a house). Each property/icon 124 may have been added using any one of the mechanisms that will be described further below, such as using inputs in the widget area 110, and/or using a template that automatically adds people and/or properties to the loss report, for example. Each icon 124 may be any suitable type of icon, such as a small and/or stylized car or house icon, for example, and may be color-coded according to the predetermined color-coding key.

In one scenario, for example, the vehicle icon 124A may be color-coded red to indicate that it represents a car or other vehicle owned by an insured (e.g., owned by the caller identified in the caller summary area 102 and represented by the icon 122A). The red color may be the same color as the elements 120A-120E in the caller summary area 102, for example. Continuing with this example scenario, the vehicle icon 124B may be color-coded blue to indicate it represents a car (or other vehicle) of a claimant (e.g., the person represented by the icon 122C), and the house icon 124C may also be color-coded blue to indicate that it represents a house (or other residence) of a claimant (e.g., the person represented by the icon 122C, or the person represented by the icon 122D).

Initially, as will be apparent from the below discussion of the widget area 110, the loss reporting tool 30 of FIG. 1 may or may not link each of the properties represented by the icons 124 to any specific one of the people represented by the icons 122. For example, the vehicle icon 124B may be color-coded blue to indicate that it represents a claimant's vehicle before the icon 124B has yet been linked to (e.g., tagged as the vehicle of) either of the claimants represented by the icons 122, or even, in some embodiments, before any claimant has yet been added to the loss report.

In one embodiment, the claim associate may select any one of the icons 122 in the person summary area 102, and/or any of the icons 124 in the property summary area 104, to view more detailed information about the corresponding person or property in the detail area 108 of the interactive display 100. If the claim associate selects icon 122C in the person summary area 102, for example, the detail area 108 may show information 130A about the corresponding person, including the person's name (e.g., if previously entered by the claim associate) and/or other information (e.g., home address), as well as an icon 130B similar to or the same as the icon 122C. The detail area 108 shown in FIG. 2 may correspond to an embodiment and scenario in which the claim associate has entered information for a claimant "Jane Doe," and then later selected (e.g., clicked on or touched) the icon 122C representing that claimant in order to view the claimant's detailed information, for example.

As seen in FIG. 2, information has also been entered linking the claimant Jane Doe to a Toyota vehicle and a house (e.g., identifying Jane Doe as the owner of that vehicle and house). The vehicle may be indicated by an icon 132A (e.g., an icon the same as or similar to icon 124B), and the house may be indicated by an icon 132B (e.g., an icon the same as or similar to icon 124C). Thus, in this example, Jane Doe is the owner of both the other car involved in the accident, and the house that was damaged by the accident. Because Jane Doe is a claimant, each of some or all of the elements 130 and 132 may be color-coded blue (e.g., the same color as icons 122C, 122D, 124B and 124C, in this scenario). In one embodiment, one or both of icons 132A and 132B may be selectable by the claim associate to provide additional detail on the corresponding property in detail area 108 (e.g., the model and year of the Toyota if icon 132A is selected, etc.).

The widget area 110 may include a number of inputs that enable the claim associate to add (and/or change) person and/or property information for the loss report. For example, the widget area 110 may include a person input 140 for adding new people to the loss report (and/or for modifying/supplementing information for people already added), and a property input 142 for adding new properties to the loss report (and/or for modifying/supplementing information for properties already added). FIG. 2 shows a series of user inputs that may be provided to the claim associate when the inputs are selected/activated in a particular sequence, as indicated by the dashed-line arrows.

As seen in FIG. 2, selection of the person input 140 may cause the interactive display 100 to present new person inputs 150, 152 and 154 (corresponding to a new insured, a new claimant, and a new "other" person, respectively), and to also present icons 146A-146E (corresponding to persons that have already been added, at least in part, using the loss reporting tool). In this example scenario, the icons 146A-146E correspond to the icons 122A-122E, respectively, in the person summary area 104. The new person inputs 150, 152 and 154 may be color-coded according to the predetermined color-coding key (e.g., red for input 150, blue for input 152, and green for input 154).

Continuing with the example sequence represented by the dashed-line arrows, if the claim associate then selects the "insured" new person input 150, the interactive display 100 may present various additional inputs for entering information about that new insured person, such as a name input 160, an address input 162, a relationship input 164 and an injury input 166, for example. Next, as is also seen in FIG. 2, selection of the name input 160 may cause the interactive display 100 to present an input 170 for entering the new insured person's first name, and another input 172 for entering the new insured person's last name. Similarly, the interactive display 100 may present inputs for entering the new insured person's home address if the claim associate selects the address input 162, or inputs for entering information indicating whether the new insured person was injured in the loss event if the associate selects the injury input 166.

If the claim associate selects the relationship input 164, the interactive display 100 may enable the associate to enter descriptions of properties that are owned (or leased, etc.) by the new insured person and were involved in the loss event. Alternatively, after the relationship input 164 has been selected, the interactive display 100 may allow the claim associate to click on one of the icons 124 in the property summary area 106 to link the corresponding property to the new insured person. As yet another alternative, the interactive display 100 may, after the relationship input 164 is selected, provide a drop-down menu listing only "unclaimed" properties (e.g., properties that were previously added to the loss report, and are represented by icons in the property summary area 106, but are not yet associated with a specific person or icon in the person summary area 104). The claim associate may then select one of the properties listed in the menu to indicate that the new person is associated with (e.g., owns) that property.

As noted above, the icons 146A-146E may correspond to people that have already been added (at least in part) to the loss report, and are represented by icons 122A-122E, respectively, in the person summary area 104. Thus, each of icons 146A-146E may be color-coded in the same manner as the corresponding one of icons 122A-122E. With reference to the scenario provided above, for example, icons 146A and 146B may be color-coded red, icons 146C and 146D may be color-coded blue, and icon 146E may be color-coded green. Moreover, as with the icons 122A-122E, each of icons 146 may be selectable by the claim associate to cause the detail area 108 to display additional information about the corresponding person. Alternatively, or additionally, each of icons 146 may, when selected, cause inputs similar to inputs 160, 162, 164 and 166 to be presented to the claim associate so that information for the corresponding person may be added or modified.

The various sets of inputs shown in the widget area 110 may be presented to the claim associate in various ways, depending upon the embodiment. For example, selection of the person input 140 may cause the inputs 150, 152, 154 and icons 146 to appear in addition to inputs 140, 142, or to appear in place of inputs 140, 142. Similarly, selection of one of inputs 150, 152, 154, or one of icons 146, may cause the inputs 160, 162, 164, 166 to appear in addition to inputs 140, 142, 150, 152, 154 and icons 146, or to appear in place of inputs 140, 142, 150, 152, 154 and icons 146, and so on. In still other embodiments, the various inputs of the widget area 110 may be presented in another suitable manner.

In one embodiment, a similar succession of inputs as that described above for the person input 140 may be presented if the claim associate instead selects the property input 142.

For example, the claim associate may be presented with one or more new vehicle inputs and/or one or more new house inputs, and may select one of those inputs to add a new property. In some embodiments, different new property inputs may be used to add a property of an insured or a property of a claimant. Moreover, as with persons who have already been added to the loss report, the widget area 110 may provide icons for selecting "existing" properties (e.g., vehicles and/or houses), which may be used to modify and/or supplement information for those properties.

During calls with customers, and/or while waiting for a call, a claim associate may desire to take free-form notes. The notes area 112 may enable the claim associate to type such notes at any time during the call (and, in some embodiments, before and/or after the call). In various different embodiments, the notes area 112 may provide a single area for entering notes regardless of content, or may provide multiple areas for entering notes with particular categories of content (e.g., one area for text describing the location of the loss event, one area for describing damage to properties, etc.). Notes entered by the claim associate in the notes area 112 may, once the loss report is submitted, be stored in the claims database 26 along with data associating the notes with the loss report/claim.

To submit the loss report information that the claim associate entered using the interactive display 100 (e.g., information describing each person and property, information indicating who is an insured, claimant, etc., information indicating which properties belong to which people, etc.), the claim associate may select/activate a submit button 176 (or other type of input) located on the interactive display 100. When activated, the submit button 176 may cause the loss report information to be submitted to the computing system 14 of FIG. 1 for storage in the claims database 26. The computing system 14, and/or employees of the insurance provider, may then initiate a new claim in the enterprise claim system 32 based upon the loss report information.

The interactive display 100 may also provide multiple tabs, or other suitable types of links, to other displays that may be of use to the claim associate. For example, the interactive display 100 shown in FIG. 2 may correspond to a setup tab 180A, and other tabs may include a loss information tab 180B for entering a description of the loss (e.g., loss location), a claim advancing activity tab 180C for performing claim-related activities such as setting up a car rental or hotel for the customer, a communication tab 180D for entering communication preferences of the customer (e.g., phone, email, etc.), and a file notes tab 180E for miscellaneous/other information that the caller wants the insurance provider to know in connection with the claim/loss event. In other embodiments, the interactive display 100 may include more, fewer, and/or different tabs than those shown in FIG. 2, or may omit the tabs 180 altogether.

In some embodiments, the interactive display 100 may also include an input (not shown in FIG. 2) for selecting a loss report "template." For example, the interactive display 100 may include a drop-down menu that provides a list of various template options corresponding to different types or categories of loss events. The template options may be generic (e.g., "1-car collision," "2-car collision," etc.) or fairly specific (e.g., "rear-end collision," "side-swipe of parked vehicles," etc.), for example. The loss reporting tool 30 may include, or otherwise be associated with, a set of macros each corresponding to one of the template options. When the claim associate selects a particular template, the corresponding macro may automatically cause certain pieces of information to be entered in the loss report (or pre-populated with a virtual loss report page) and reflected in the interactive display 100.

If the claim associate selects the "rear-end collision" template, for example, the corresponding macro may cause one insured and one claimant to be automatically added (e.g., such that the person summary area 104 includes one red person icon and one blue person icon), as well as one insured vehicle and one claimant vehicle (e.g., such that the property summary area 106 includes one red vehicle icon and one blue vehicle icon). As another example, if the claim associate selects the "side-swipe of parked vehicles" template, the corresponding macro may cause one insured and two claimants to be automatically added (e.g., such that the person summary area 104 includes one red person icon and two blue person icons), as well as one insured vehicle and two claimant vehicles (e.g., such that the property summary area 106 includes one red vehicle icon and two blue vehicle icons).

To fill in the details for each person and property that was automatically added by the template macro (e.g., to enter the insured name(s), the claimant name(s), etc.), the claim associate may utilize the widget area 110 (e.g., by selecting the appropriate "existing" icons 146). The claim associate may also use the widget area 110 to add additional people and/or properties beyond the number/types automatically added by the template. Moreover, the widget area 100 (or another portion of the interactive display 100) may also allow the claim associate to delete people and/or properties that were automatically added by the template macro.

The interactive display 100 may also include other types of information and/or inputs not shown in FIG. 2. For example, the interactive display 100 may include one or more areas that provide text-based assistance to the claim associate, such as Standard Claim Processes (SCPs), for example.

As noted above, in some embodiments, the interactive display 100 may be provided to a customer for direct entry of loss report information. In such an embodiment, certain aspects of the interactive display 100 may be different than shown in FIG. 2 and/or described above. For example, the tabs 180C and/or 180D, and/or the notes area 112, may be omitted. As another example, text-based assistance may be more thorough/detailed if the interactive display 100 is provided directly to a customer.

As can be seen from the above discussion, the components in the environment 10 of FIG. 1, when using the above techniques and interactive displays such as the interactive display 100 of FIG. 2, may drastically shorten the time required for a claim associate to complete a loss report, and may even allow a customer/policyholder to quickly and efficiently complete a loss report with limited help from the claim associate. As such, the resource usage or consumption of the components in the environment 10 (e.g., in the computing system 14 and/or the client device 12) during the loss reporting process may be greatly reduced. For example, the need for the claim associate to ask repetitive questions while cycling through scripted loss reporting screens, may be reduced or eliminated, thereby causing the number of processor cycles utilized by the computing system 14 and/or the client device 12 to be greatly reduced.

IV. Exemplary Home Screen Interactive Display

Figure 3:
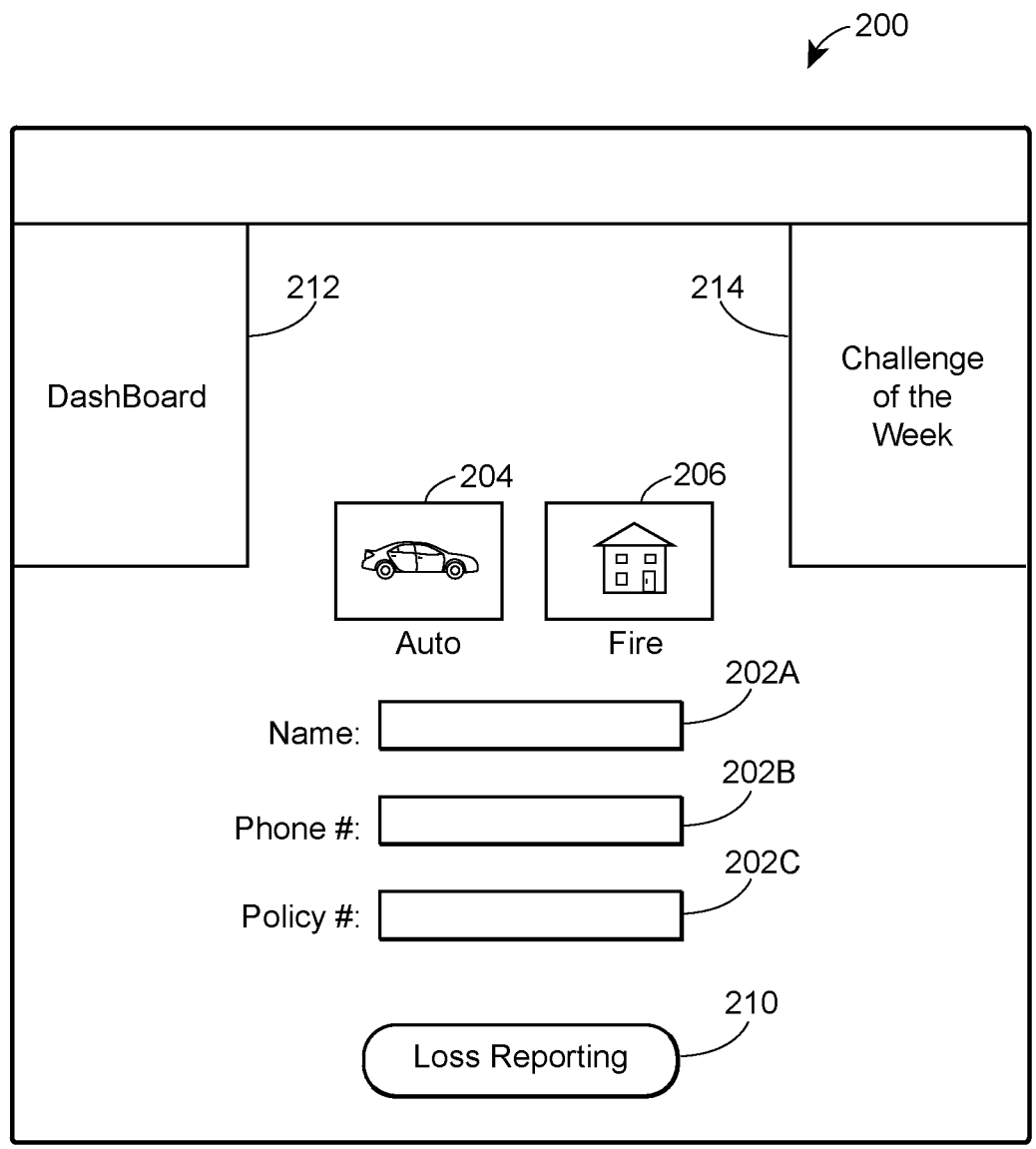
FIG. 3 depicts an exemplary home screen interactive display that may be used by a claim associate or other user prior to accessing the interactive display of FIG. 2, and/or to access other informational and/or interactive displays, according to an embodiment.

FIG. 3 depicts an exemplary home screen interactive display 200 that may be used by a claim associate or other user prior to accessing the interactive display 100 of FIG. 2, and/or to access other informational and/or interactive displays, according to an embodiment. The interactive display 200 may include a set of controls/inputs that a claim associate may use to enter caller/customer information that is typically asked at or near the beginning of a call. For example, the interactive display 200 may include a name input 202A for entering the caller's name, a phone input 202B for entering the caller's telephone (contact) number, and/or a policy number input 202C for entering the caller's insurance policy number.

The interactive display 200 may also include inputs that the claim associate may use to indicate the type of insurance relevant to the loss event about which the customer is calling, such as an auto insurance input 204 and a home/fire insurance input 206, for example. The claim associate may select one of inputs 204, 206 by clicking on (or touching, etc.) the desired input, which may be a virtual button with an appropriate icon (e.g., as shown in FIG. 3), for example.

The interactive display 200 may also include an input 210 (e.g., a virtual button) that, if selected/activated by the claim associate, will cause the interactive display 100 of FIG. 2 to be presented to the associate. When the input 210 is selected, the information that was entered using some or all of the inputs 202 may be used to automatically populate the caller summary area 102 of FIG. 2. In some embodiments, the selection of an insurance type using input 204 or 206 may dictate some of the content (e.g., icons, inputs, text-based guidance, etc.) included in the interactive display 100. For example, the property summary area 106 may only show icons of vehicles if input 204 was selected, and only show icons of homes if input 206 was selected. In other embodiments, the selection of the insurance type does not affect the content included in the interactive display 100, but is used for other purposes (e.g., in conjunction with the policy number entered via the policy number input 202C to ensure that the caller and/or policy is correctly identified, etc.). In still other embodiments, the inputs 204 and 206 are omitted.

The home screen interactive display 200 may also include other features, such as a dashboard 212 and a challenge area 214, for example. The dashboard 212 may show particular metrics, or may be selectable by the claim associate to present the metrics in a different window, etc. As just one example, the dashboard 212 may include metrics directed to individual or team performance. The number of calls taken by the individual claim associate over some period of time, for example, may be tracked and used to indicate individual performance. Various quality metrics may be displayed as well. Individual performance and/or metrics may be displayed visually in graphical and/or numerical formats.

The challenge area 214 may include text and/or graphics, or may provide a selectable link to text, graphics and/or video, that describes a hypothetical call scenario, and asks the claim associate how to proceed based upon that scenario. As just one example, the challenge area 214 may include text stating "CHALLENGE: The caller says that she lost control of her vehicle and ran into a mailbox. Which template should you choose to best facilitate entry of the loss information?" The challenge area 214 may also enable the claim associate to enter a response, and/or may display to the associate an indication of the preferred/best response.

In various other embodiments, the home screen interactive display 200 may include more, fewer and/or different features than those shown in FIG. 3. As just one example, the interactive display 200 may include a drop-down menu item for selection of a template. The home screen interactive display 200 may be fitted entirely within a display screen (e.g., display screen 54 of FIG. 1), or may require vertical and/or horizontal scrolling to view all parts of the interactive display 200, for example.

Figure 4:
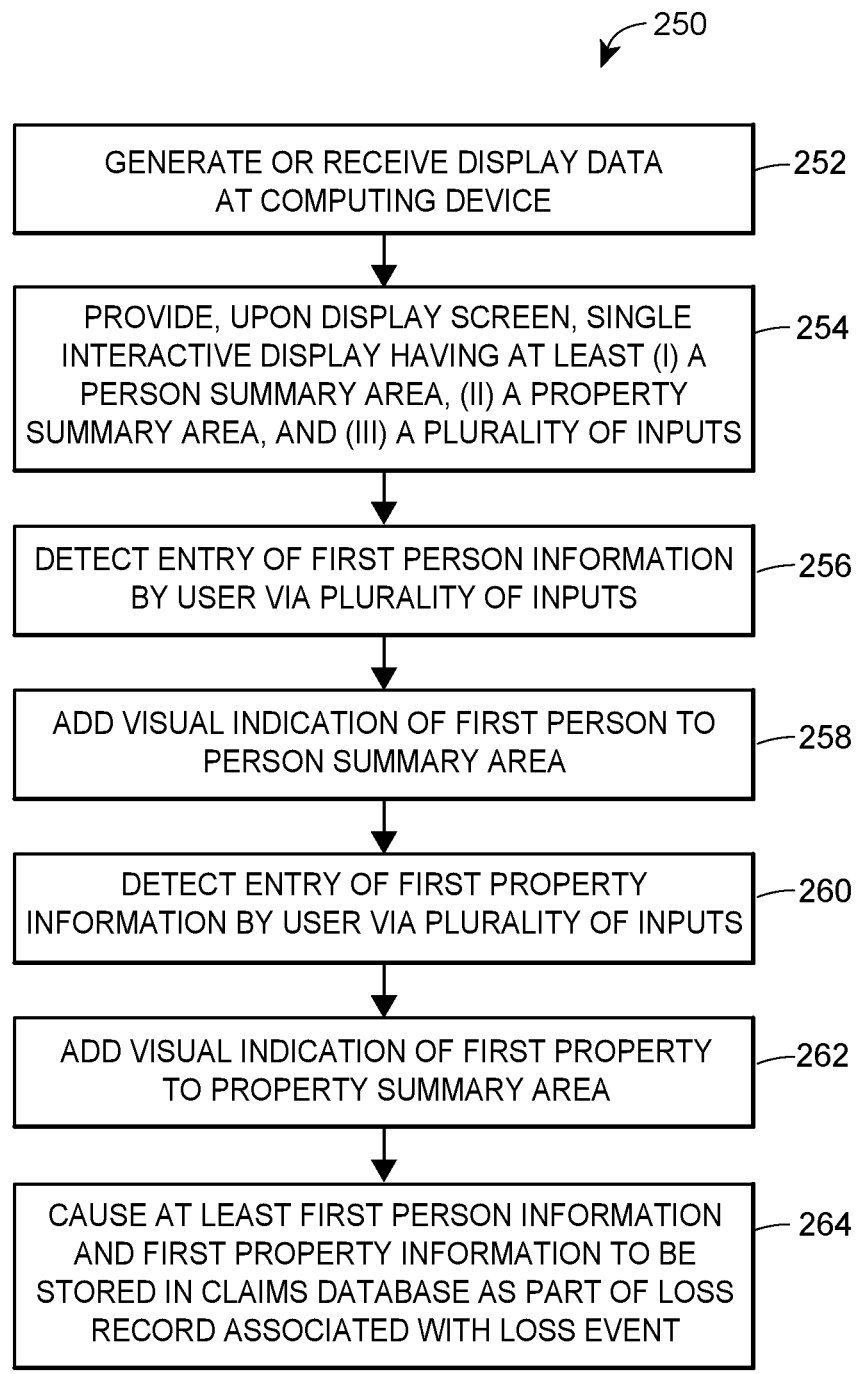
FIG. 4 depicts a flow diagram of an exemplary method for enabling a claim associate or other user to efficiently enter insurance claim information without necessarily following a script, according to one embodiment.

V. Exemplary Process Flow for Efficient Entry of Insurance Claim Information FIG. 4 depicts a flow diagram of an exemplary method 250 for enabling a claim associate or other user to efficiently enter insurance claim information without necessarily following a script, according to an embodiment. The method 250 may be implemented in (e.g., performed by one or more processors of) a computing device such as the client device 12 of FIG. 1, for example.

In the method 250, display data may be generated, or received, at a computing device of a user (block 252). For example, the display data may be received from a remote server by accessing a web page stored on the remote server, or may be generated by a dedicated software application executing on the computing device. The user may be a claim associate, or a customer (e.g., an insured person involved in the loss event being reported), for example.

One or more processors of the computing device may process the display data to provide, upon a display screen of the computing device, a single interactive display (block 254). Though referred to as a "single" interactive display, the display may require that the user of the computing device scroll or shift the display in order to view all portions of the display. The single interactive display may have at least a person summary area for indicating persons associated with a loss event, a property summary area for indicating properties associated with the loss event, and/or a plurality of inputs collectively for entering person information and property information. Further, in some embodiments, the interactive display may include other types of display areas, such as a detail area for showing additional information about a selected person or property, and/or a caller summary area for showing information about the caller (e.g., the caller's name and/or insurance policy number), for example.

Entry of first person information, by the user of the computing device via the plurality of inputs, may be detected (block 256). The information may have been entered using inputs such as those shown in the widget area 110 of FIG. 2, for example. While the first person information corresponds to a particular person, the first person information entered may or may not be complete in terms of the set of information that is typically entered or required for a loss report. The first person information may include any type of information suitable for the loss report, such as a person's name, home address, injury status (e.g., whether the person was injured due to the loss event), status with respect to the claim about to be initiated (e.g., insured, claimant, or "other"), etc. The first person information may also include a selection/indication of a particular property (e.g., car, house, etc.) as being a property of the person to which the first person information corresponds.

In response to detecting the entry of the first person information, a visual indication of a first person may be added to the person summary area (block 258). The visual indication may be a small stick figure or other human-like icon, for example. If the first person information included an indication of whether the corresponding person was an insured or a claimant, the visual indication may be colorcoded with a color corresponding to the indicated person type (e.g., red for insured, blue for claimant, etc.).

Entry of first property information, by the user via the plurality of inputs, may be detected (block 260). The information may have been entered using inputs such as those shown in the widget area 110 of FIG. 2, for example. While the first property information corresponds to a particular property, the first property information entered may or may not be complete in terms of the set of information that is typically entered or required for a loss report. The first property information may include any type of information suitable for the loss report, such as the make, model and year of a vehicle, for example. The first property information may also include a selection/indication of a particular person as being the owner of the property to which the first property information corresponds.

In response to detecting the entry of the first property information, a visual indication of a first property may be added to the property summary area (block 262). If the first person information included an indication that the first property belongs to the first person, for example, the visual indication of the first property may be color-coded with a color corresponding to the first person (e.g., red if an insured, blue if a claimant, etc.).

At least the first person information and the first property information may be caused to be stored in a claims database, as part of a loss record associated with the loss event (block 264). For example, the information may be stored in the claims database by sending the corresponding data over a network (e.g., network 16 of FIG. 1) in response to the user pressing a virtual "submit" button on the interactive display.

In some embodiments, the method 250 may also include one or more additional blocks not shown in FIG. 4. For example, the method 250 may include blocks in which a selection, by the user of the computing device, of the visual indication of the first person is detected and, in response, at least a portion of the first person information is shown in a detail area of the interactive display, and/or blocks in which a selection, by the user, of the visual indication of the first property is detected and, in response, at least a portion of the first property information is shown in the detail area.

As another example, the method 250 may include blocks, prior to block 252, in which display data for a home screen interactive display (e.g., the interactive display 200 of FIG. 3) is generated or received at the computing device, the home screen interactive display is provided upon the display screen, entry of caller information by the user (e.g., claim associate) using inputs of the home screen interactive display is detected, and selection of the loss reporting tool is detected. In such an embodiment, generating or receiving the display data at block 252, and/or providing the single interactive display at block 254, may be in response to detecting the selection of the loss reporting tool. Moreover, in such an embodiment, the method 250 may include a block, prior to detecting selection of the loss reporting tool, in which a selection of an insurance type from among a plurality of insurance type options (e.g., auto, fire/home, etc.) is detected.

Figure 5:
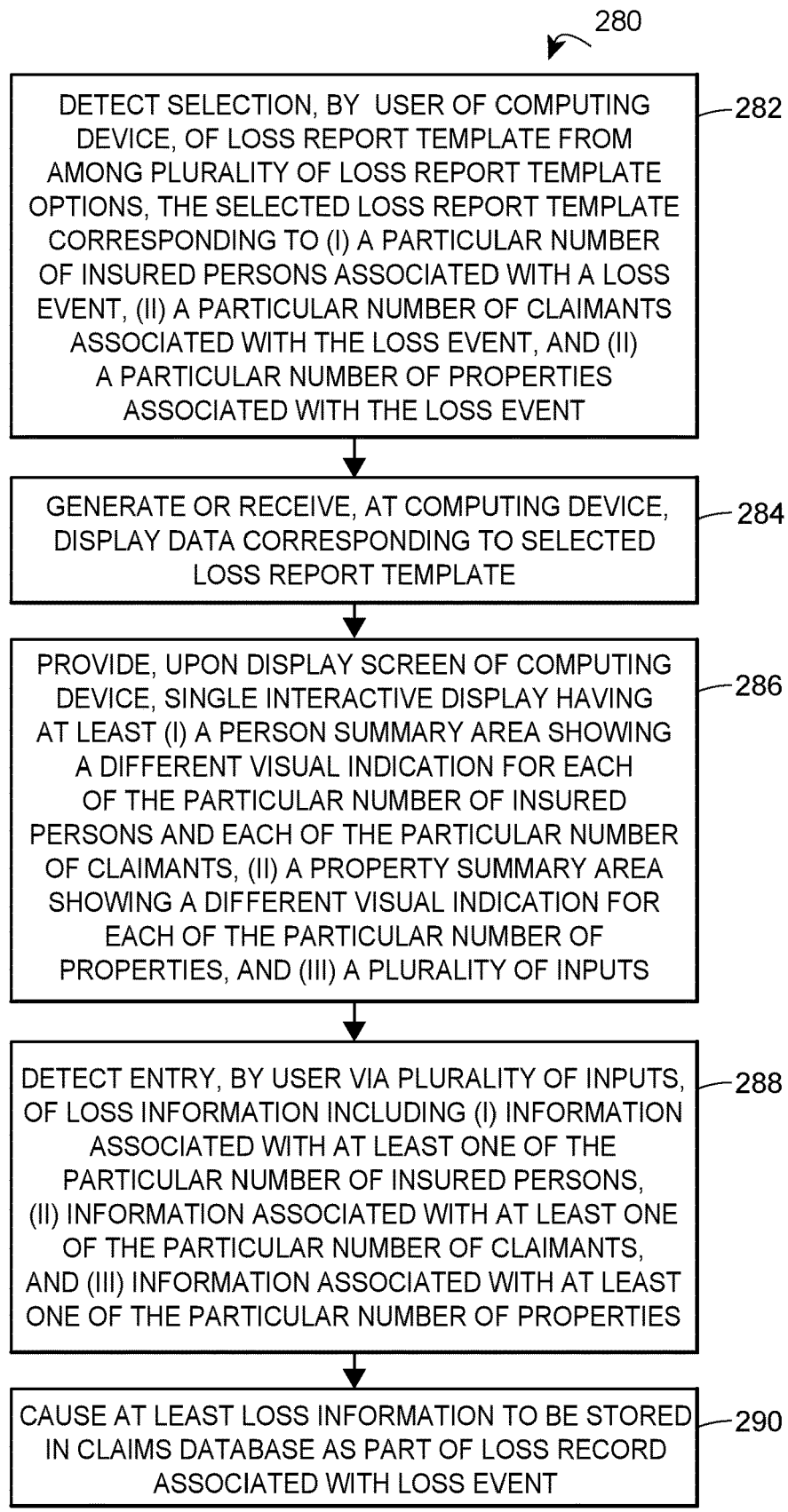
FIG. 5 depicts a flow diagram of an exemplary method for enabling a claim associate or other user to efficiently enter insurance claim information using a template, according to one embodiment.

VI. Exemplary Process Flow for Efficient Entry of Insurance Claim Information Using a Template FIG. 5 depicts a flow diagram of an exemplary method 280 for enabling a claim associate or other user to efficiently enter insurance claim information using a template, according to an embodiment. The method 280 may be implemented in (e.g., performed by one or more processors of) a computing device such as the client device 12 of FIG. 1, for example.

In the method 280, a selection, by a user of the computing device, of a loss report template from among a plurality of loss report template options may be detected (block 282). The user may be a claim associate, or a customer (e.g., an insured person involved in the loss event being reported), for example. The selected loss report template may correspond to a particular number of insured persons associated with a loss event, a particular number of claimants associated with the loss event, and/or a particular number of properties associated with the loss event. For example, a "rear-end collision" template may correspond to one insured person, one claimant, and two vehicles, while a "pothole" template may correspond to one insured person, no claimants, and one vehicle.

In some embodiments, the nature of the properties may be specified by the template in further detail. For example, the "rear-end collision" template described above may correspond not only to two vehicles, but more specifically to one insured vehicle and one claimant vehicle, and the "pothole" template described above may correspond not only to one vehicle, but more specifically to one insured vehicle.

Display data corresponding to the selected loss report template may be generated, or received, at the computing device (block 284). For example, the display data may be received from a remote server by sending information indicative of the selected template to the remote server, or may be generated according to the selected template by a dedicated software application executing on the computing device.

One or more processors of the computing device may process the display data to provide, upon a display screen of the computing device, a single interactive display (block 286). Though referred to as a "single" interactive display, the display may require that the user of the computing device scroll or shift the display in order to view all portions of the display. The single interactive display may have at least a person summary area showing a different visual indication for each of the particular number of insured persons and each of the particular number of claimants defined by the template, a property summary area showing a different visual indication for each of the particular number of properties defined by the template, and/or a plurality of inputs that are collectively for entering person information and property information. Further, in some embodiments, the interactive display may include other types of areas, such as a detail area for showing additional information about a selected person or property, and/or a caller summary area for showing caller information (e.g., the caller's name and/or insurance policy number), for example.

Entry of loss information, by the user via the plurality of inputs, may be detected (block 288). The detected loss information may include information associated with at least one of the particular number of insured persons defined by the template, information associated with at least one of the particular number of claimants defined by the template, and/or information associated with at least one of the particular number of properties defined by the template. The information may have been entered using inputs such as those shown in the widget area 110 of FIG. 2, for example.

At least the loss information may be caused to be stored in a claims database as part of a loss record associated with the loss event (block 290). For example, the information may be stored in the claims database in response to the user pressing a virtual "submit" button on the interactive display.

In some embodiments, the method 280 may also include one or more additional blocks not shown in FIG. 5. For example, the method 280 may include blocks in which a selection, by the user of the computing device, of the visual indication of a first person is detected and, in response, a portion of the entered loss information that corresponds to the first person is shown in a detail area of the interactive display.

Figure 6:
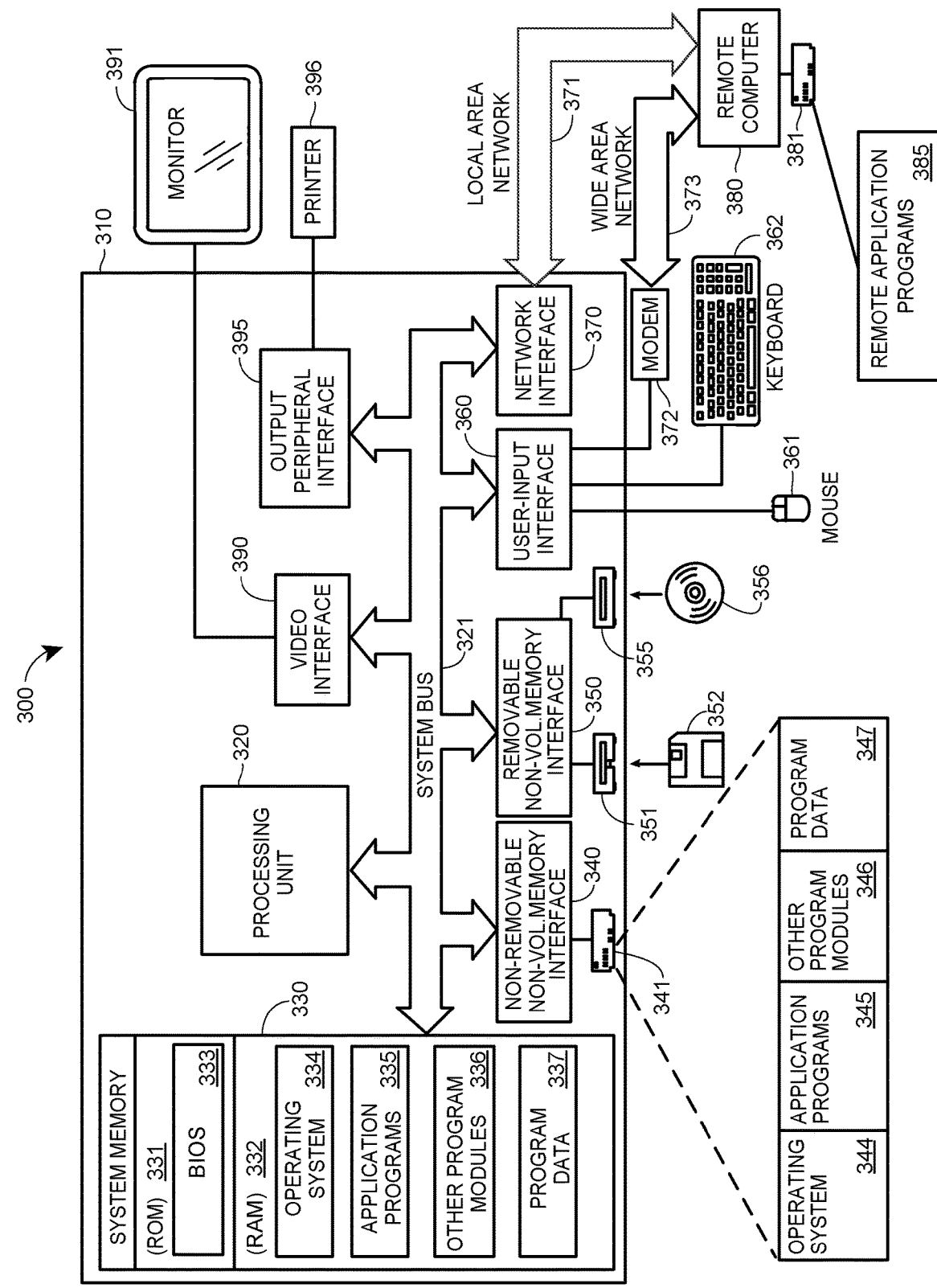
FIG. 6 depicts an exemplary computer system in which the techniques described herein may be implemented, according to one embodiment.

VII. Exemplary Computer System for the Provision, Operation and/or Use of an Integrated Tool for Improved Workflow Efficiency FIG. 6 depicts an example computer system 300 in which the techniques described herein may be implemented, according to an embodiment. The computer system 300 of FIG. 6 includes a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 typically includes a variety of computer-readable media. Computer-readable media can be any available media that can be accessed by computer 310 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 6 illustrates operating system 334, application programs 335, other program modules 336, and program data 337.

The computer 310 may also include other removable/non-removable, volatile/nonvolatile computer storage media. By way of example only, FIG. 6 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 6 provide storage of computer-readable instructions, data structures, program modules and other data for the computer 310. In FIG. 6, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 6. The logical connections depicted in FIG. 6 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 6 illustrates remote application programs 385 as residing on memory device 381.

The techniques for the provision, operation and/or use of a tool for efficient loss reporting described above may be implemented in part or in their entirety within a computer system such as the computer system 300 illustrated in FIG. 6. The computer 310 may be a computing device of a claim associate or customer/policyholder (e.g., client device 12 of FIG. 1), and the remote computer 380 may be a server of an insurance provider (e.g., within the computing system 14 of FIG. 1), for example. In some such embodiments, the LAN 371 or WAN 373 may be omitted (e.g., communications may between computer 310 and computer 380 may only occur via WAN 373, or only via LAN 371). Application programs 345 may include a web browser application such as web browser application 50 of FIG. 1 (e.g., if the loss reporting tool is provided via instructions of a web page stored at the computer 380), or a dedicated software application that provides some or all functionality of the loss reporting tool, for example. In operation, the claim associate or customer may view the user interface of FIGS. 2 and/or 3 via monitor 391 and provide inputs via keyboard 362 and/or mouse 361, for example.

VIII. Exemplary Method Embodiments

In one aspect, a computer-implemented method for facilitating efficient loss reporting may include generating or receiving display data at a computing device, and providing, upon a display screen of the computing device and by one or more processors of the computing device processing the display data, a single interactive display having at least (i) a person summary area for indicating persons associated with a loss event, (ii) a property summary area for indicating properties associated with the loss event, and/or (iii) a plurality of inputs collectively for entering person information and property information. The method may also include detecting, by the one or more processors, entry of first person information by a user of the computing device via the plurality of inputs and, in response to detecting the entry of the first person information, adding, by the one or more processors, a visual indication of a first person to the person summary area. The method may also include detecting, by the one or more processors, entry of first property information by the user via the plurality of inputs and, in response to detecting the entry of the first property information, adding, by the one or more processors, a visual indication of a first property to the property summary area. The method may also include causing, by the one or more processors, at least the first person information and the first property information to be stored in a claims database as part of a loss record associated with the loss event. As a result, loss reporting information may be more efficiently entered/recorded. The method may include additional, fewer or alternative actions, such as any of those discussed elsewhere herein.

For instance, providing a single interactive display may include providing a single interactive display having at least (i) the person summary area, (ii) the property summary area, (iii) the plurality of inputs, and/or (iv) a detail area for showing additional information about a selected person or property, and the method may further comprise one or both of (i) detecting, by the one or more processors, a selection by the user of the visual indication of the first person and, in response, showing at least a portion of the first person information in the detail area, and/or (ii) detecting, by the one or more processors, a selection by the user of the visual indication of the first property and, in response, showing at least a portion of the first property information in the detail area.

Additionally, or alternatively, detecting entry of first person information may include detecting a selection of a person type from among a plurality of person type options, the plurality of person type options including (i) an insured person and/or (ii) a claimant, and/or adding a visual indication of the first person to the person summary area may include adding a color-coded visual indication of the first person to the person summary area, the color-coded visual indication of the first person having a color corresponding to the selected one of the plurality of person type options.

Additionally, or alternatively, detecting entry of first person information may further include detecting entry of one or more of (i) a name of the first person, (ii) a home address of the first person, and/or (iii) an indication of whether the first person was injured due to the loss event.

Additionally, or alternatively, detecting entry of first person information may further include detecting a selection of the first property as being a property of the first person, and/or adding a visual indication of the first person to the person summary area may further include color-coding the visual indication of the first property with the color corresponding to the selected one of the plurality of person type options.

Additionally, or alternatively, detecting entry of first person information made via the plurality of inputs by a user of the computing device may include detecting entry of first person information made via the plurality of inputs by a claim associate.

Additionally, or alternatively, providing a single interactive display may include providing a single interactive display having at least (i) the person summary area, (ii) the property summary area, (iii) the plurality of inputs, and/or (iv) a caller summary area for showing caller information including at least a name of a caller and/or an insurance policy number of the caller.

Additionally, or alternatively, the plurality of inputs may be a first plurality of inputs, and/or the method may further comprise, prior to providing the single interactive display, generating and/or receiving home screen display data at the computing device, providing, upon the display screen and by the one or more processors processing the home screen display data, a home screen interactive display having at least a second plurality of inputs, detecting, by the one or more processors, entry of the caller information made via the second plurality of inputs by the claim associate, and/or detecting, by the one or more processors, selection of a loss reporting tool made via the second plurality of inputs by the claim associate. One or both of (i) generating or receiving the display data, and/or (ii) providing the single interactive display, may be in response to detecting the selection of the loss reporting tool.

Additionally, or alternatively, detecting entry of first person information made via the plurality of inputs by a user of the computing device may include detecting entry of first person information made via the plurality of inputs by an insured person involved in the loss event.

In another aspect, a computer-implemented method for facilitating efficient loss reporting may include detecting, by one or more processors of a computing device, a selection, by a user of the computing device, of a loss report template from among a plurality of loss report template options. The selected loss report template may correspond to (i) a particular number of insured persons associated with a loss event, (ii) a particular number of claimants associated with the loss event, and/or (ii) a particular number of properties associated with the loss event. The method may also include generating or receiving, at the computing device, display data corresponding to the selected loss report template, and providing, upon a display screen of the computing device and by the one or more processors processing the display data, a single interactive display having at least (i) a person summary area showing a different visual indication for each of the particular number of insured persons and each of the particular number of claimants, (ii) a property summary area showing a different visual indication for each of the particular number of properties, and/or (iii) a plurality of inputs collectively for entering person information and property information. The method may also include detecting, by the one or more processors, entry, by the user via the plurality of inputs, of loss information including (i) information associated with at least one of the particular number of insured persons, (ii) information associated with at least one of the particular number of claimants, and/or (iii) information associated with at least one of the particular number of properties, and/or causing, by the one or more processors, at least the loss information to be stored in a claims database as part of a loss record associated with the loss event. As a result, loss reporting information may be more efficiently entered/recorded. The method may include additional, fewer or alternative actions, such as any of those discussed elsewhere herein.

For instance, providing a single interactive display may include providing a single interactive display having at least (i) the person summary area, (ii) the property summary area, (iii) the plurality of inputs, and/or (iv) a detail area for showing additional information about a selected person or property, and/or the method may further comprise, prior to causing the loss information to be stored in the claims database, detecting, by the one or more processors, a selection by the user of a visual indication of a first person from among either the visual indications of the particular number of insured persons or the visual indications of the particular number of claimants, and, in response to detecting the selection of the visual indication of the first person, showing, by the one or more processors, in the detail area a portion of the entered loss information that corresponds to the first person.

Additionally, or alternatively, detecting a selection of a loss report template from among a plurality of loss report template options may include detecting a selection of the loss report template from among a plurality of loss report template options that includes (i) a first template corresponding to one insured vehicle, one or more insured persons, no claimant vehicles, and no claimants, and/or (ii) a second template corresponding to one or more insured persons, one insured vehicle, one or more claimants, and one claimant vehicle.

Additionally, or alternatively, detecting a selection of a loss report template may include detecting a selection of the first template, and/or providing a single interactive display may include providing a single interactive display having (i) a person summary area showing a visual indication of each of the one or more insured persons but not showing a visual indication of any claimant, and/or (ii) a property summary area showing a visual indication of the one insured vehicle but not showing a visual indication of any claimant vehicle.

Additionally, or alternatively, detecting a selection of a loss report template may include detecting a selection of the second template, and providing a single interactive display may include providing a single interactive display having (i) a person summary area showing a visual indication of each of the one or more insured persons and a visual indication of each of the one or more claimants, and/or (ii) a property summary area showing a visual indication of the one insured vehicle and a visual indication of the one claimant vehicle IX. Exemplary Computing Device Embodiments In one aspect, a computing device for facilitating efficient loss reporting may include a display screen, one or more processors, and a memory. The memory may store instructions that, when executed by the one or more processors, cause the one or more processors to generate or receive display data at the computing device, and provide, upon the display screen and by processing the display data, a single interactive display having at least (i) a person summary area for indicating persons associated with a loss event, (ii) a property summary area for indicating properties associated with the loss event, and/or (iii) a plurality of inputs collectively for entering person information and property information. The instructions may also cause the one or more processors to detect entry of first person information made via the plurality of inputs by a user of the computing device and, in response to detecting the entry of the first person information, add a visual indication of a first person to the person summary area. The instructions may also cause the one or more processors to detect entry of first property information made by the user via the plurality of inputs and, in response to detecting the entry of the first property information, add a visual indication of a first property to the property summary area. The instructions may also cause the one or more processors to cause at least the first person information and the first property information to be stored in a claims database as part of a loss record associated with the loss event. The computing device may include additional, fewer or alternative components, and/or components with additional, less or alternative functionality, such as any of the components and/or functionality discussed elsewhere herein.

For instance, the single interactive display may have at least (i) the person summary area, (ii) the property summary area, (iii) the plurality of inputs, and/or (iv) a detail area for showing additional information on a selected person or property, and the instructions may further cause the one or more processors to (i) detect a selection by the user of the visual indication of the first person and, in response, show at least a portion of the first person information in the detail area, and/or (ii) detect a selection by the user of the visual indication of the first property and, in response, show at least a portion of the first property information in the detail area.

Additionally, or alternatively, the first person information may include a selection by the user of a person type from among a plurality of person type options, the plurality of person type options including (i) an insured person and/or (ii) a claimant, and/or the visual indication of the first person may be a color-coded visual indication of the first person having a color corresponding to the selected one of the plurality of person type options.

Additionally, or alternatively, the first person information may further include one or more of (i) a name of the first person, (ii) a home address of the first person, and/or (iii) an indication of whether the first person was injured due to the loss event.

Additionally, or alternatively, the first person information may further include a selection by the user of the first property as a property of the first person, and, in response to detecting the entry of the first person information, the instructions may further cause the one or more processors to color-code the visual indication of the first property with the color corresponding to the selected one of the plurality of person type options.

Additionally, or alternatively, the single interactive display may have at least (i) the person summary area, (ii) the property summary area, (iii) the plurality of inputs, and/or (iv) a caller summary area for showing caller information including at least a name of a caller and an insurance policy number of the caller.

X. Exemplary Point of Service Screen

As detailed above and shown in FIG. 2, in one aspect, a virtual "Point of Service" screen or webpage may be provided. The Point of Service screen may be part of an application or website built by an insurance provider. The Point of Service screen may provide a solution that allows for collection of loss information in a semi-structured, more flexible way that gives the user the ability to collect information as provided by the customer/caller. The tool may allow the user to model a rough outline of the loss to better structure subsequent questions. This method may help the user avoid re-asking questions and having the caller explain something multiple times. The Point of Service screen may also reduce the user's dependability on the notepad, which requires them to then transfer the notes into the application.

The Point of Service screen may break down the current linear-based insurance customer interaction into a non-linear, more flexible manner of collecting information; give the user the ability to navigate through the application and fill in the necessary information in the order provided by the customer; show a percentage complete of each tab/page so that the user knows which tab/page has questions and information that still need to be collected from the caller; and/or seek to reduce loss reporting call time by streamlining data collection and negating the need for repetitive actions. The Point of Service screen may provide a new business process to allow the user to capture information in a non-linear, more flexible manner, which allows users to capture data as the caller explains what occurred.

The present embodiments (and the Point of Service screen) may also provide an icon-based approach, such as clicking upon person icons representing insured or claimants to allow for data entry by the user. The present embodiments (and the Point of Service screen) may also provide a color-coding based approach. For instance, red colored icons may represent insureds, or property covered or insured by the insurance provider. Blue colored icons may represent claimants, and green colored icons may represent witnesses.

The icons or virtual representations of people (insureds, claimants, witnesses, etc.) and property (autos, homes, personal belongings, etc.) may be a more visual and interactive way of telling and recording facts and events associated with an insurance-related event and/or insurance loss or claim. For instance, clicking upon a vehicle icon may allow an insurance customer or insurance representative to start recording information about a vehicle accident, and/or a related loss or insurance claim. Thus, the Point of Service screen may provide a more intuitive user or customer experience.

XI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the provision, operation and/or use of a loss reporting tool that enables claim associates and/or customers to more efficiently perform loss reporting through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A non-transitory computer-readable medium storing instructions that, when executed by one or more processors of a computing device, cause the computing device to:
provide, for presentation to a claim associate taking a call relating to a loss event from a caller, an interactive display that simultaneously displays (i) a person summary area to indicate persons associated with the loss event, (ii) a property summary area to indicate properties associated with the loss event, and (iii) an input area including a plurality of inputs, the plurality of inputs including a new person input that enables a user to enter person information associated with the loss event and a new property input that enables the user to enter property information associated with the loss event;
dynamically generate and display, on an interactive display, one or more person icons in the person summary area and one or more property type icons in the property summary area, the one or more person icons and the one or more property type icons representing persons and properties, respectively, associated with the loss event, wherein each of the person icons and each of the property type icons is generated and displayed as a user selects inputs in the input area to add a corresponding person or property via the interactive display, and wherein each of the persons icons is a graphical representation of a person and each of the property type icons is a graphical representation of a type of the corresponding property; and
dynamically link specific ones of the person icons to specific ones of the property type icons as the user specifies relationships between the specific ones of the person icons and the specific ones of the property type icons via the interactive display, at least in part by (i) when the claim associate is adding a particular person, dynamically linking a first person icon corresponding to the particular person to a first property type icon corresponding to a particular property responsive to the user clicking on the first property type icon in the property summary area, or dragging and dropping the first person icon to a particular area of the display screen, or (ii) when the claim associate is adding a particular property, dynamically linking a second property type icon corresponding to the particular property to a second person icon corresponding to a particular person responsive to the user clicking on the second person icon in the person summary area, or dragging and dropping the second property type icon to a particular area of the display screen.

2. The non-transitory computer-readable medium of claim 1, wherein dynamically linking the specific ones of the person icons to the specific ones of the property type icons includes generating and displaying visual associations between the linked person icons and property type icons as the user specifies the relationships via the interactive display.

3. The non-transitory computer-readable medium of claim 2, wherein generating and displaying the visual associations includes applying matching color coding to the linked person icons and property type icons as the user specifies the relationships via the interactive display.

4. The non-transitory computer-readable medium of claim 1, wherein the instructions further cause the computing device to:
enable the user to specify a role of each added person with respect to the loss event; and
visually code the one or more person icons to indicate the roles specified by the user for the corresponding one or more persons.

5. The non-transitory computer-readable medium of claim 1, wherein the instructions further cause the computing device to display, on the interactive display, a caller summary area depicting information associated with a caller.

6. The non-transitory computer-readable medium of claim 1, wherein the one or more property type icons include a graphical representation of a vehicle.

7. The non-transitory computer-readable medium of claim 1, wherein the one or more property type icons include a graphical representation of a residence.

8. A method of facilitating efficient entry, by a user, of loss event information, the method comprising:
providing, for presentation to a claim associate taking a call relating to a loss event from a caller, an interactive display that simultaneously display (i) a person summary area to indicate persons associated with the loss event, (ii) a property summary area to indicate properties associated with the loss event, and (iii) an input area including a plurality of inputs, the plurallity of inputs including a new person input that enables a user to enter person information associated with the loss event and a new property input that enables the user to enter property information associated with the loss event;
dynamically generating and displaying, on the interactive display, one or more person icons in the person summary area and one or more property type icons in the property summary area, the one or more person icons and the one or more property type icons representing persons and properties, respectively, associated with the loss event, wherein each of the person icons and each of the property type icons is generated and displayed as a user selects inputs in the input area to add a corresponding person or property via the interactive display, and wherein each of the persons icons is a graphical representation of a person and each of the property type icons is a graphical representation of a type of the corresponding property; and
dynamically linking specific ones of the person icons to specific ones of the property type icons as the user specifies relationships between the specific ones of the person icons and the specific ones of the property type icons via the interactive display, at least in party by (i) when the claim associate is adding a particular person, dynamically linking a first person icon corresponding to the particular person to a first property type icon corresponding to a particular property responsive to the user clicking on the first property type icon in the property summary area, or dragging and dropping the first person icon to a particular area of the display screen, or (ii) when the claim associate is adding a particular property, dynamically linking a second property type icon corresponding to the particular property to a second person icon corresponding to a particular person responsive to the user clicking on the second person icon in the person summary area, or dragging and dropping the second property type icon to a particular area of the display screen.

9. The method of claim 8, wherein dynamically linking the specific ones of the person icons to the specific ones of the property type icons includes generating and displaying visual associations between the linked person icons and property type icons as the user specifies the relationships via the interactive display.

10. The method of claim 9, wherein generating and displaying the visual associations includes applying matching color coding to the linked person icons and property type icons as the user specifies the relationships via the interactive display.

11. The method of claim 8, further comprising:
enabling the user to specify a role of each added person with respect to the loss event; and
visually coding the one or more person icons to indicate the roles specified by the user for the corresponding one or more persons.

12. The method of claim 8, further comprising:
displaying, on the interactive display, a caller summary area depicting information associated with a caller.

13. The method of claim 8, wherein the one or more property type icons include a graphical representation of a vehicle.

14. The method of claim 8, wherein the one or more property type icons include a graphical representation of a residence.

* * * * *